US005865944A

United States Patent [19]

Reiter

[11] Patent Number: 5,865,944

[45] Date of Patent: Feb. 2, 1999

[54] APPARATUS FOR DIRECTLY APPLYING A LIQUID OR PASTY MEDIUM ONTO A MOVING MATERIAL WEB

[75] Inventor: Walter Reiter, Heidenheim, Germany

[73] Assignee: Voith Sulzer Papiermaschinen GmbH, Munich, Germany

[21] Appl. No.: 576,094

[22] Filed: Dec. 21, 1995

[30] Foreign Application Priority Data

| | | | |
|---|---|---|---|
| Dec. 23, 1994 | [DE] | Germany | 44 46 373.1 |
| Nov. 17, 1995 | [DE] | Germany | 295 18 282 U |

[51] Int. Cl.[6] .......... B32B 31/00

[52] U.S. Cl. .......... 156/578; 118/244; 118/239

[58] Field of Search .......... 118/206, 221, 118/244, 257, 261, 674, 679, 681, 686, 70, 100, 106, 123, 126, 209, 210, 239, 322, 324; 156/578

[56] References Cited

U.S. PATENT DOCUMENTS

| | | | |
|---|---|---|---|
| 1,747,104 | 2/1930 | Case | 118/126 |
| 2,761,365 | 9/1956 | Bridgewater | 118/257 X |
| 3,363,530 | 1/1968 | Rice | 118/257 X |
| 5,409,534 | 4/1995 | Kustermann | 118/201 |
| 5,466,292 | 11/1995 | Kustermann | 118/257 |

FOREIGN PATENT DOCUMENTS 4338776 5/1994 Germany .

OTHER PUBLICATIONS

Official Action of the Finnish Patent Office dated 6 Sep. 1996.

English equivalent to FI 932297 (Corresponding U.S. Application text.)

*Primary Examiner*—Francis J. Lorin

*Attorney, Agent, or Firm*—Ostrolenk, Faber, Gerb & Soffen, LLP

[57] ABSTRACT

Apparatus for directly applying a liquid or pasty medium onto a moving paper or board web. A flexible endless loop rotating belt is supported by guide rolls in the loop. A shoe in the loop has a convexly curved surface over which the belt is guided and the web is carried over the belt as it passes the guide surface of the shoe. Toward the upstream end of the shoe, a predosing apparatus applies a medium to the web. Toward the downstream end of the shoe, a final dosing blade doses the medium applied to the web. The shoe has a region, at least at the upstream region thereof, the cross-sectional profile of which is adjustable, and that adjustment is enabled section by section zone-wise across the width of the web.

22 Claims, 2 Drawing Sheets

APPARATUS FOR DIRECTLY APPLYING A LIQUID OR PASTY MEDIUM ONTO A MOVING MATERIAL WEB

BACKGROUND OF THE INVENTION

The invention relates to an apparatus for directly applying a liquid or pasty medium, e.g. a coating medium, onto a moving material web, in particular a web consisting of paper or board. The invention comprises predosing means and final dosing means arranged at a distance from each other and concerns a support for the web as it is being coated.

Coating apparatus are known in which the moving material web to be coated is wrapped around and supported on a selected sector of a cylindrical opposing roll. A predosing means, for example a free jet nozzle application unit or a doctor blade application unit with a pressure chamber, applies the liquid or pasty medium under pressure. A final dosing means provided, for example, with a doctor blade element, finally doses the applied medium. It is disadvantageous in this arrangement if the material web passes through a sharp or small radium curvature between the predosing point and the final dosing point, because large centrifugal forces arise which unpredictably throw parts of the applied coating medium from the material web. Since the coating medium is thrown off relatively irregularly, this often leads to an uneven final coating of the liquid or pasty medium on the material web.

In an apparatus of this type disclosed in DE 43 38 776 A1, the predosing means and the final dosing means are associated with their own respective opposing rolls or their own respective endless belts on which the web rides. The supporting points of the predosing means and the final dosing means can be in such a geometric arrangement that the material web is only exposed to small centrifugal forces in the area of its passage from the predosing means to the final dosing means, and the tension force in the material web can also be regulated by controlled differential speeds of both of the opposing rolls or both of the endless belts. But this construction involves a considerable operative effort and does not permit optimal guidance and support of the material web.

SUMMARY OF THE INVENTION

The object of the invention is to provide an apparatus of the mentioned type in which, in a simple structural manner, irregularities of the applied liquid or pasty medium are avoided and there is supported guidance of the material web.

This technical problem is solved by the invention which concerns an apparatus for directly applying a liquid or pasty medium onto a moving paper or board web. An apparatus of the type disclosed in the above-noted DE 43 38 776 A1 may be adapted with the invention. A flexible endless loop rotating belt is supported by guide rolls in the loop. A shoe in the loop has a convexly curved surface over which the belt is guided and the web is carried over the belt as it passes the guide surface of the shoe. Toward the upstream end of the shoe, a predosing apparatus applies a medium to the web. Toward the downstream end of the shoe, a final dosing blade doses the medium applied to the web. The shoe has a region, at least at the upstream region thereof, the cross-sectional profile of which is adjustable, and that adjustment is enabled section by section zone-wise across the width of the web.

In the invention, the two supporting points for the predosing means and the final dosing means cooperate with only one endless loop belt and a guide surface of a supporting shoe for the belt. The guide surface ensures continuous guidance and support of the endless belt and the web supported thereon. The cross-sectional profile of the guiding surface, along the path of the web and the belt and around axes across the width of the web, can be designed such that centrifugal forces scarcely act on the material web and the applied layer of the liquid or pasty coating medium during the passage of the material web over the area between the predosing means and the final dosing means. Therefore, irregularities of the applied profile of the liquid or pasty coating medium, which might otherwise occur as a result of too large centrifugal forces, are avoided. Finally, the apparatus according to the invention is distinguished by a simple mode of construction requiring only a few structural parts and only a single drive.

The guiding surface of the supporting shoe preferably has a gentle curvature preferably with as large radius as possible in order to minimize the centrifugal forces acting on the material web and on the applied coating medium as they pass the guiding surface. Appropriate design of the contour progression of the guiding surface along the material web path provides optimal guidance of the material web within the entire coating unit.

In a preferred embodiment of the invention, the cross-sectional profile of the guiding surface of the supporting shoe is adjustable, at least in the area of the predosing means. Thus, the surface contour of the guiding surface can be adapted to the respective operating conditions. In a preferred embodiment, the part of the support shoe with the guiding surface is slightly bendable about axes extending in the direction of the width of the web at least in the region of the predosing means. Adjustment of a section of the supporting shoe which is smoothly bendable can be accomplished, for example, by means of adjusting spindles, servo motors, an adjusting hydraulic system or other known adjusting mechanisms.

Preferably, individual zone-wise adjustability of the cross-sectional profile of the guiding surface is provided at individual zones across the width of the moving material web. In an advantageous embodiment of the invention, the supporting shoe is subdivided zone-wise across the width of the moving material web into individual pressure chambers. These chambers can be loaded such that the pressing forces exerted by the shoe can be locally adapted across the width of the material web to the respective operating conditions in order to achieve the desired cross-sectional profile of the applied medium on the material web.

In a preferred embodiment of the invention, the rotating endless loop belt is guided about deflection rolls. At least one of those rolls is driven, and at least one roll is designed as a regulating roll, i.e. a roll adjustable in position to maintain web tension. The endless belt usefully is comprised of plastic, rubber or a rubber-like plastic. For example, the endless belt can be provided with internal reinforcement comprising a strainer or mesh texture or with woven-in reinforcing threads or inlaid layers of reinforcing threads, like those disclosed in U.S. Pat. No. 5,320,702 (which corresponds to EP 0 469 338 B1), incorporated by reference, for the pressing mantle of a pressing means.

Preferably, the predosing means comprises a free jet nozzle application unit or a doctor blade application unit with a pressure chamber. In a further preferred embodiment of the invention, the predosing means comprises an application roll which draws from a liquid chamber and forms an application nip with the endless belt. However, other suitable application units for the direct application of the liquid or pasty medium can be used. The final dosing means preferably has a doctor element, which is preferably a doctor blade.

Other features and advantages of the present invention will become apparent from the following description of the invention which refers to the accompanying drawings.

DETAILED DESCRIPTION OF THE INVENTION

Figure 1:
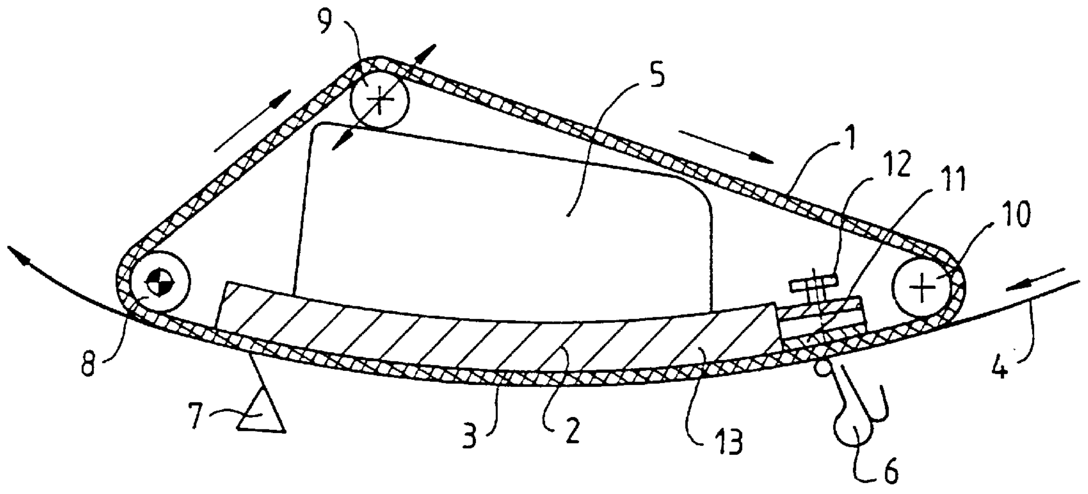
FIG. 1 shows a first exemplary embodiment of the apparatus according to the invention in a simplified cross sectional view.

The present invention is useful in, for example, web coating apparatus, shown in the above noted German publication DE 43 38 776 A1. In the exemplary embodiment according to FIG. 1 hereof, a flexible endless loop belt 1 runs over the outward facing guiding surface 3 of a supporting shoe 2 that is disposed inside the loop of the belt. The belt passes around and is guided by a drive roll 8, a regulating roll 9 and a deflection roll 10.

The supporting shoe 2 has a rigid downstream part 13 that is longer along the web path and a smoothly bendable upstream part 11 that adjoins the rigid part and is shorter along the web path. The rigid part 13 of the supporting shoe 2 is securely mounted on a supporting body 5 of the apparatus.

The bendable part 11 is provided with adjusting means 12 for adjusting the extent to which it is bent. This is designed to geometrically adapt the application zone for the coating medium to the shape and placement of the predosing means. Examples of a bendable part 11 that would permit this may include having the bendable part be in the form of a thin plate, or a bottom plate that is bent toward a top plate of the part. The material, thickness and length of the part 11 may be selected to enable it to be bent.

A predosing means 6 is only schematically illustrated. It may comprise a free jet nozzle coating medium application unit or a doctor blade coating medium application unit with a pressure chamber which is associated with the endless belt 1. The predosing means is opposite the nonrigid bendable part 11 of the shoe. Examples of these are known.

A final dosing means 7, also schematically shown, includes, for example, a doctor element which is associated with the endless belt 1. The final dosing means is arranged at a distance downstream along the web path from the predosing means 6, and it is opposite the rigid part 13 of the supporting shoe 2 near its downstream end.

A material web 4 comprised, for example, of paper, board or a textile material, is guided along the path between the predosing means 6 and the final dosing means 7 as the web is supported on the endless belt 1, and the belt is supported on the guiding surface 3 of the supporting shoe 2. The guiding surface 3 of the supporting shoe 2 is only slightly curved convexly along the material web passage, around a transverse axis across the width of the web, i.e. in its cross-sectional profile.

At the inlet side (the right-hand side in FIG. 1), the material web 4 first moves onto the outer surface of the endless belt 1 and is then moved together with the belt past the predosing means 6. Here the liquid or pasty medium is applied in a known manner onto the material web. Required counter pressure is supplied by the opposing section of the supporting shoe 2. The material web 4, now provided with the applied medium, together with the endless belt 1 subsequently pass the area between the predosing means 6 and the final dosing means 7 where they are continuously supported by the guiding surface 3 of the supporting shoe 2. Since the guiding surface 3 has only a very large radius curvature, only minimal centrifugal forces act on the applied medium, so that the just applied coating on the web 4 remains very uniform. This is because irregular throwing off of applied medium as a result of centrifugal forces is prevented on account of the very gentle curvature of the guiding surface 3. The web subsequently passes the final dosing means 7 where the opposing section of the supporting shoe 2 provides the necessary counter-pressure. After this, the web 4 runs off the endless belt 1 at the driving roll 8.

In a variant which is not illustrated, the pressing force of the supporting shoe 2 on the endless belt 1 and the passing web 4 can be adjusted zone-wise along the width direction of the web, i.e. transverse to the direction of movement, in order to adapt to respective operating conditions. This adaptation may be effected by applying varying strength forces against the endless belt 1 across the width. Alternatively, profile alteration of the guiding surface 3 and particularly the non-rigid part 11 of the supporting shoe 2 can be carried out zone-wise along the width direction of the material web 4. In one example, the known adjusting mechanism 12 is subdivided into sections across the web for this purpose rather than being a unitary mechanism across the entire shoe. Therefore, the individual zones, across the shoe, of the non-rigid part 11 of the supporting shoe 2 can be pivoted by means of respective adjusting mechanisms 12 about axes extending in the direction of width of the material web. This allows the application conditions at the predosing means 6 to be adjusted.

Figure 2:
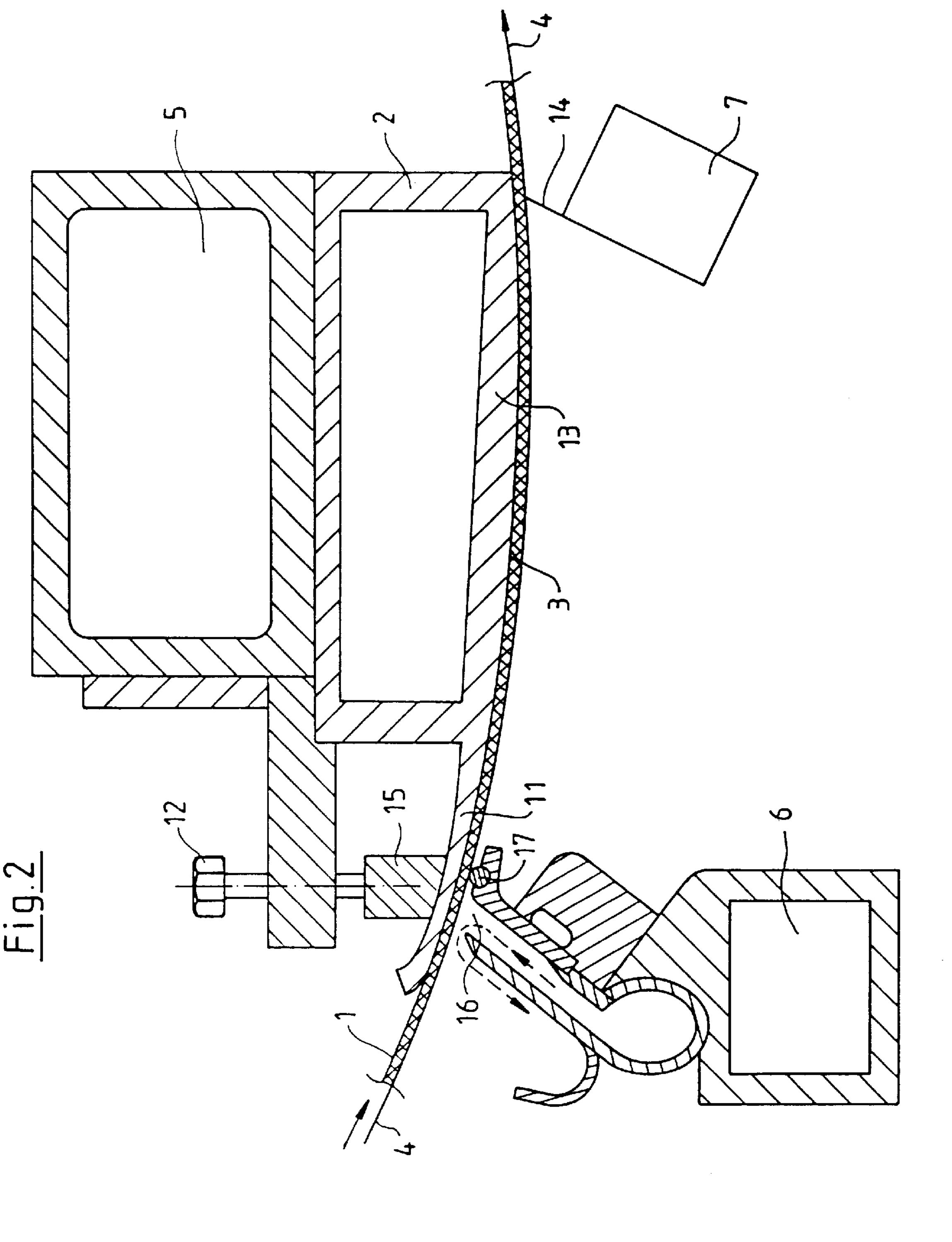
FIG. 2 shows a second exemplary embodiment of the apparatus according to the invention in a simplified cross-sectional view.

In the second embodiment shown in FIG. 2, corresponding components have been designated with the same reference numbers as in FIG. 1 and the above descriptions thereof apply. The driving roll, the regulating roll and the deflecting rolls for the endless belt have been omitted for a clearer overview. The direction of passage of the material web in FIG. 2 is opposite that in FIG. 1.

The adjusting mechanism 12 is comprised of adjusting spindles which are provided with pressure bodies 15 for adjusting the profile of the non-rigid part 11 of the supporting shoe 2. For example, the spindle passes through an opening, possibly threaded in the thick upper part of the support body and its rotation moves the body 15 and thus the shoe part 11 to different upraised conditions. This can be done across the entire shoe or zone-wise across the shoe. A known application unit is schematically shown as a predosing means 6 including a pressure chamber 16. The liquid or pasty medium is applied onto the material web by means a roll doctor 17. The final dosing means 7 has a scraping element 14 for fine dosing the applied medium.

Figure 3:
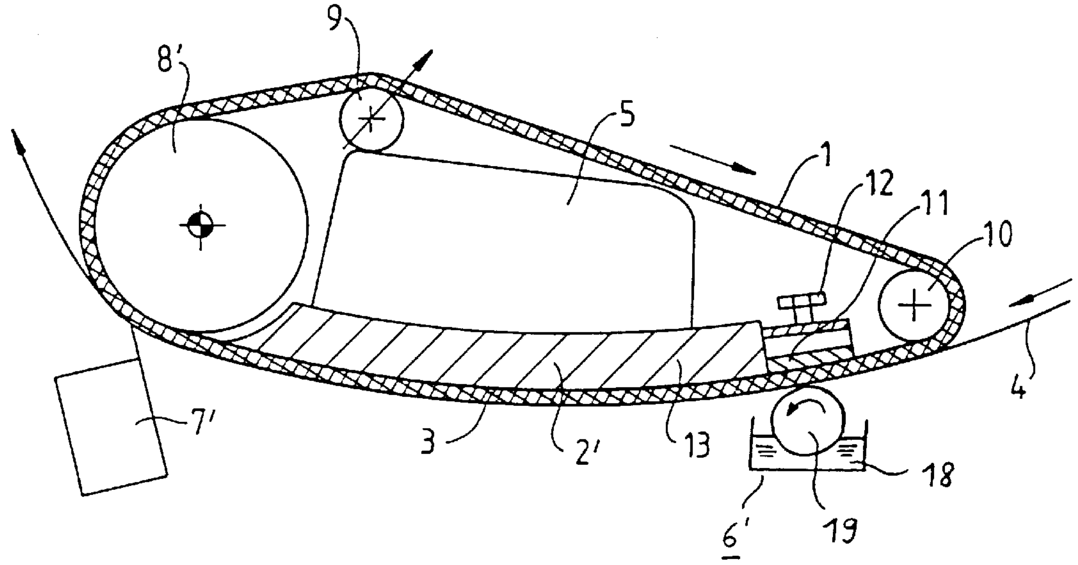
FIG. 3 shows a third exemplary embodiment of the apparatus according to the invention in a simplified cross sectional view.

In the third embodiment in FIG. 3, the same reference numbers have been again used as in FIG. 1 for corresponding components. The predosing means 6' in this embodiment comprises an application roll 19 which draws the liquid or pasty medium from a liquid chamber 18. The application roll 19 forms an application nip together with the endless belt 1 in the area of the supporting shoe 2. Instead of using the illustrated application unit including an application roll, one can use a free jet nozzle application unit or a doctor blade application unit with a pressure chamber. Further, as in the case of the two previously described embodiments, an application unit with an application roll can alternatively be used.

The final dosing means 7' in the third embodiment is not associated with the opposing section of the supporting shoe 2 as in FIG. 1, but instead is associated with a driving roll 8' having a somewhat larger diameter. This minimizes frictional losses in this area.

The supporting shoe 2' does not in this embodiment extend up to the final dosing means 7. At its end facing the driving roll 8', the shoe 2' follows the curvature of the driving roll 8' and is appropriately flattened.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. Apparatus for directly applying a liquid medium or pasty medium onto a web of paper or board moving past the apparatus, the apparatus comprising:

a flexible endless loop rotating belt having an inner surface within the loop and an opposite outer surface;

a stationary supporting shoe disposed in the endless loop, the shoe including a guiding surface over which the inner surface of the endless belt is guided;

belt guide means in the loop of the belt for guiding the belt in a loop and for guiding the belt over the guiding surface of the shoe;

predosing means for applying the medium to the web, the predosing means being disposed at the outer surface of the belt, above the web passing on the belt, and above the guiding surface of the shoe;

final dosing means for metering the medium applied to the web, the final dosing means being spaced at a distance downstream in the path of the belt and the web from the predosing means and disposed above the outer surface of the belt and the web thereon for finally dosing the medium on the web traveling on the belt.

2. The apparatus of claim 1, wherein the guiding surface of the shoe has a large radius of curvature around an axis transverse to the shoe and the belt and the curvature being convex toward the belt, whereby the belt is guided over the curvature of the guiding surface.

3. The apparatus of claim 2, further comprising means for adjusting the cross-sectional profile of the supporting shoe with reference to the belt moving past the shoe over at least a part of the length of the shoe along the path of the web at least in the area of the predosing means.

4. The apparatus of claim 1, further comprising means for adjusting the profile of the supporting shoe with reference to the belt moving past the shoe over at least a part of the length of the shoe along the path of the web at least in the area of the predosing means.

5. The apparatus of claim 3, wherein the supporting shoe, at least in the region of the predosing means, including the guiding surface thereof is non-rigid about an axis extending in the width direction of and transverse to the moving direction of the web.

6. The apparatus of claim 5, wherein the shoe has sections across the width of the web, the apparatus further comprising means for adjusting the cross-sectional profile of the guiding surface of the shoe adapted for adjusting the profile in the individual sections of the shoe across the width of and transverse to the direction of movement of the web.

7. The apparatus of claim 6, wherein the means for adjusting includes individually loadable pressure chambers at each of the sections across the width of the web.

8. The apparatus of claim 3, wherein the shoe is subdivided into sections across the width of the web, wherein the means for adjusting the cross-sectional profile of the guiding surface of the shoe is adapted for adjusting the profile in individual ones of the sections of the shoe across the width of and tranverse to the direction of movement of the web.

9. The apparatus of claim 1, wherein the guide means for the belt comprise deflection rolls located inside the loop of the belt for holding the belt under tension over the guiding surface of the shoe and enabling the belt to rotate and be guided on the shoe.

10. The apparatus of claim 9, wherein the deflection rolls are so disposed as to have a first one of the deflection rolls upstream of the shoe and a second one of the deflection rolls downstream of the shoe, and the first and second deflection rolls being so placed as to guide the belt over the guiding surface of the shoe.

11. The apparatus of claim 9, further comprising means for driving at least one of the deflection rolls to rotate, for moving the endless belt to rotate.

12. The apparatus of claim 9, wherein at least one of the rolls is supported for being a regulating roll which is adjustable in position with reference to the other rolls and the belt for adjusting the tension on the belt passing around the deflection rolls.

13. The apparatus of claim 1, wherein the endless belt is comprised of plastic, rubber or rubber-like plastic.

14. The apparatus of claim 10, wherein the endless belt includes reinforcement material therein.

15. The apparatus of claim 1, wherein the predosing means comprises a free jet nozzle application means.

16. The apparatus of claim 1, wherein the predosing means comprises a doctor blade application unit with an associated pressure chamber for supplying medium under pressure to the application unit.

17. The apparatus of claim 1, wherein the predosing means comprises an application roll in contact with and rotatable with the movement of the belt therewith for predosing medium on the belt; a liquid chamber for containing liquid form medium and through which the application roll rotates, and the application roll being positioned with reference to the belt for forming an application nip together with the belt.

18. The apparatus of claim 1, wherein the final dosing means includes a doctor element for doctoring the medium on the web.

19. The apparatus of claim 10, wherein the final dosing means is disposed above the belt and the shoe generally in the area of the second deflection roll which is downstream of the shoe, and the second deflection roll is located generally immediately after the downstream end of the shoe.

20. The apparatus of claim 1 wherein the final dosing means is disposed above the guiding surface of the shoe.

21. The apparatus of claim 1, wherein the shoe has a rigid portion and adjustable portion.

22. The apparatus of claim 21, wherein the predosing means is disposed above the adjustable portion of the shoe.

* * * * *